Sept. 26, 1961 D. N. GOLDBERG 3,001,622
BRAKE OR CLUTCH ASSEMBLY PARTICULARLY ADAPTED FOR VEHICULAR USE
Filed July 16, 1958 2 Sheets-Sheet 1

INVENTOR
David N. Goldberg

BY
Burns, Doane, Benedict & Lyons
ATTORNEYS

Sept. 26, 1961 D. N. GOLDBERG 3,001,622
BRAKE OR CLUTCH ASSEMBLY PARTICULARLY ADAPTED FOR VEHICULAR USE
Filed July 16, 1958 2 Sheets-Sheet 2
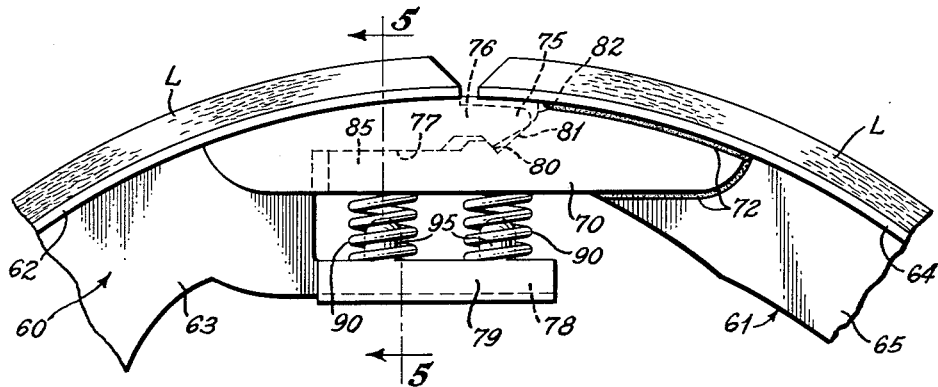
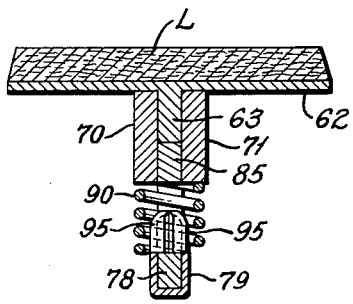
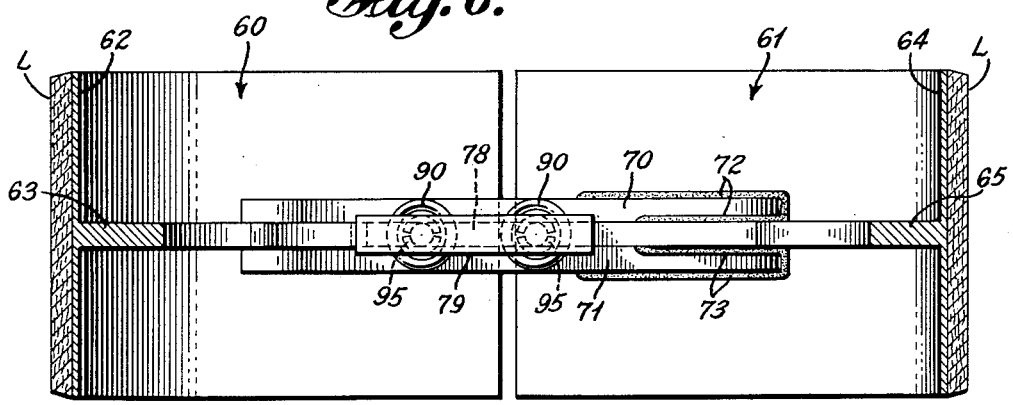
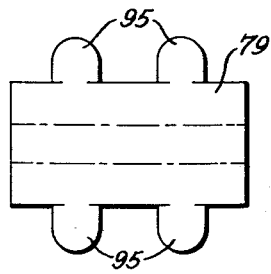
INVENTOR
David N. Goldberg
BY Burns, Doane, Benedict & Crons
ATTORNEYS

United States Patent Office 3,001,622
Patented Sept. 26, 1961

3,001,622
BRAKE OR CLUTCH ASSEMBLY PARTICULARLY ADAPTED FOR VEHICULAR USE
David N. Goldberg, 1510 Main St., Wheeling, W. Va.
Filed July 16, 1958, Ser. No. 748,954
11 Claims. (Cl. 192—76)

Generally the herein described invention relates to a friction unit assembly for brake or clutch structures. More particularly, the friction unit assembly herein described is specifically adapted for various vehicular applications such as automotive and truck brake systems.

In its broader aspects the friction unit assembly of this invention embodies separate arcuate shoe sections interconnected in longitudinally aligned end to end relation whereby the shoe sections in use move relative to one another to expand the assembly to approximate the arc of curvature of the inner cylindrical surface of the brake or clutch drum. The invention thus provides a friction unit assembly for so-called internal brake structures, i.e., where the assembly is expanded into the inner cylindrical surface of a brake drum.

It is well recognized that a basic objective in the operation of brake and clutch structures is to achieve uniform engagement of the friction lining material with the drum throughout the entire surface area of the lining material. Ideally, such uniform engagement should take place simultaneously at all points on the friction lining material, and, upon application of greater brake or clutch actuating force, this force should be distributed uniformly over the area of the friction lining material.

Accomplishing these theoretically ideal lining engagement conditions avoids hot spots in the lining material as are prevalent where non-uniform engagement of the lining material with the drum occurs. It follows that cooler operation of the structure and consequent increased life of the friction lining material and drum may be expected. Further, in performing the intended braking or clutching operation, less brake or clutch applying force is required.

With the now prevalently common rigid arcuate brake shoes the pressure of lining material engagement with the drum may very well not be uniform but be concentrated at the center or toward the so-called dead end of the shoe where the brake actuating force is applied. This follows since the fixed arc of the shoe, being of a smaller arc diameter than that of the drum with which it is to engage, forms a lever which pivots about the anchor pin or dead end of the shoe to move the lining material into drum engagement without the shoe being able to adjust to drum diameter or compensate for lining wear. This lack of uniform pressure of engagement invites overheating of the brake structure and production of lining hot spots.

In the instant invention, seeking to overcome the above and other recognized deficiencies of prior brake and clutch structures, arcuate shoe sections are interconnected so that such sections may pivot relative to one another and/or the interconnected ends of the shoe sections move longitudinally toward one another with a camming action as the actuating force is applied to the friction unit assembly. This camming action is provided by an inclined camming surface on the socket forming a part of the shoe interconnection, such that relative movement between the shoe section ends in a direction radially of the arc of curvature of the friction unit assembly is obtained. Biasing means normally retains the shoe sections in a contracted state, positioned such that the friction unit assembly is out of engagement with the drum. Such biasing means permits the shoe sections to pivot with respect to one another and the camming action to take place, such that the friction unit assembly expands to closely approximate the arc of curvature of the drum as the friction lining material on such assembly engages the drum. Incorporated into the interconnection between the shoe section ends is means for retaining accurate longitudinal alignment of the interconnected shoe sections.

It is a primary object of the instant invention to provide a friction unit assembly adapted to be selectively engaged with an internal clutch or brake drum surface wherein separate arcuate shoe sections are interconnected by an improved structure to retain them in longitudinal alignment and permit them to adjust relative to each other, such that maximum area of friction lining material on the assembly will engage the surface of the drum with substantially uniform pressure per unit area of lining material.

A further object of this invention is to provide a sectionalized friction unit assembly including arcuate shoe sections interconnected in longitudinally aligned end to end relation by a mechanism permitting combined pivotal and longitudinal camming movement of the shoe sections relative to one another while retaining the shoe sections accurately aligned.

A further object of the invention is to provide a friction unit assembly embodying interconnected arcuate shoe sections wherein each of the sections has an inwardly extending web element and means are associated with the web element to provide for arcuate longitudinal alignment of the sections while pivotal and camming relative movements between the interconnected shoe sections take place as the assembly adjusts to the arc of curvature of the drum.

An additional object of the invention relates to the provision of a friction unit assembly incorporating spring biasing means cooperating with stop means which limit the extent of pivotal movement between the sections and wherein such biasing means urges the pivotal interconnection to assume a retracted position relative to a camming surface incorporated in the shoe section interconnecting means.

Another object is the provision of a friction unit assembly in accordance with the above object wherein the camming surface is provided with an abutment portion to limit relative end to end movement of the shoe sections upon application of energizing force to the live end of the assembly.

The above and other more specific objects of the invention will be more readily appreciated and become apparent by reference to the detailed description given hereinafter with respect to embodiments of the invention as illustrated on the accompanying drawings. The hereinafter set forth specific description is given in conjunction with such drawings in which:

FIGURE 4 is a side elevational view of a modified shoe section interconnecting means in a friction unit assembly;

FIGURE 5 is a sectional view taken on line 5—5 of FIGURE 4;

FIGURE 6 is a plan view of the structure shown in FIGURE 4; and

FIGURE 7 illustrates the manner of formation of the spring retainer employed in the embodiment of FIGURES 4, 5 and 6.

Before referring to specific details of the friction unit assembly embodiments illustrated on the drawings, it might be pointed out that the drawings seek to show only the salient features of the means employed in the interconnection of separate arcuate shoe sections as these sections are interconnected in making up the friction unit assembly of the instant invention. The drawings do not illustrate details of the various means which may be employed in anchoring the friction unit assembly to form one end of such assembly into the dead end. Likewise, the various force applying mechanisms which may be employed, in connection with the friction unit assembly of this invention, to effect actuation in, for example, a braking operation, have not been illustrated.

The end anchoring devices for the dead end of the assembly and the force applying mechanisms employed at the live end of the assembly may take a wide variety of forms and illustration herein of such conventional features is not deemed necessary as they are not part of the instant invention.

Without illustrating the above referred to details of brake and clutch structures, it is to be recognized that in carrying into practice the teachings of the instant invention as described in detail hereinafter, one end of the friction unit assembly is anchored by a suitable means which will form this end into the dead end of the assembly. Likewise, the other end of such assembly is connected to a suitable mechanism for applying brake actuating force such that this end of the assembly forms the live end. Additionally, it will be pointed out that although a single interconnection between two arcuate shoe sections is specifically illustrated, the complete friction unit assembly may be made up of two or more arcuate shoe sections interconnected by the means as disclosed and described in detail hereinafter.

Figure 1:
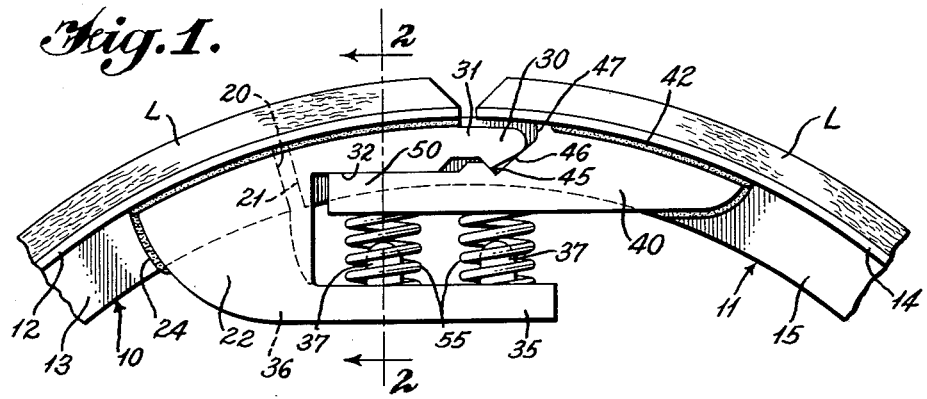
FIGURE 1 is a side elevational view illustrating details of the shoe section interconnecting means in a friction unit assembly of the instant invention.
Figure 2:
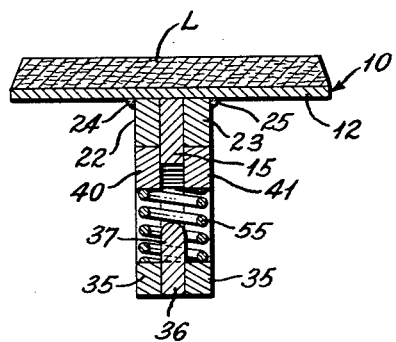
FIGURE 2 is a sectional view taken on line 2—2 of FIGURE 1.
Figure 3:
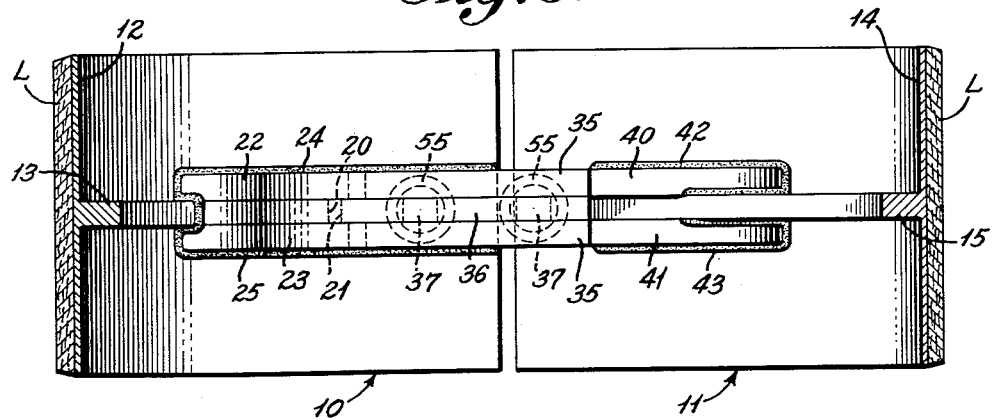
FIGURE 3 is a plan view of the structure shown in FIGURE 1.

FIGURES 1, 2 and 3 illustrate an embodiment of the instant invention for interconnecting arcuate shoe sections 10 and 11. Shoe section 10 includes a cylindrical segment 12 providing an outer surface to which is suitably attached friction lining material L. A web element 13 extends radially inwardly from the inner surface of cylindrical segment 12 and is secured thereto to provide substantial rigidity to the cylindrical segment in forming the shoe section. The relationship of web element 13 to cylindrical segment 12 is shown more clearly in the sectional view of FIGURE 2.

Shoe section 11 is formed similarly to shoe section 10 in having a cylindrical segment 14 carrying on its outer surface friction lining material L, with a web element 15 extending radially inwardly of the inner surface of segment 14.

In the form of the interconnecting means provided between shoe sections 10 and 11 as specifically illustrated, the web element 13 terminates at 20, short of the end of cylindrical segment 12. Web element 15 on shoe section 11 extends beyond cylindrical segment 14 to terminate at 21. It will thus be seen that a portion of web element 15 overlies the end of cylindrical segment 12 of shoe section 10. These web elements are aligned in connection of the shoe sections so that ends 20 and 21 are opposed to one another.

As shown more clearly in FIGURES 2 and 3, a pair of guide elements 22 and 23 are secured, as by welding 24 and 25, respectively, on opposite sides of web element 13. These guide elements provide a pocket in which the end of web element 15 is received. It will thus be seen that the end of web element 15 slidably engages between the opposing faces of guide elements 22 and 23 such that the shoe sections 10 and 11 are accurately retained in longitudinally aligned end to end relation.

In the embodiment of FIGURES 1 through 3, connecting pin means is provided at the end of shoe section 10 by a lug 30 formed on the outer end of each of the guide elements 22 and 23. As shown on FIGURE 1 with respect to guide element 22, lug 30 is connected to element 23 by a neck portion 31. Lugs 30 are provided with arcuately curved end portions which pivotally and slidably engage in socket means formed on the end of shoe section 11. Inwardly of the end of shoe section 10, stop means is provided by the radially inner edge 32 of the portion of the guide element extending outwardly to neck portion 31 and lug 30.

A spring supporting leg 35 extends outwardly from the end of shoe section 10 on each guide element 22 and 23 to overly lug 30, neck portion 31 and edge 32 on each guide element. A spring retainer 36 is secured to web element 13 between legs 35 on guide elements 22 and 23. This spring retainer has spring locating projections 37 to function as will be described hereinafter.

Shoe section 11 is provided with socket means to cooperate with the connecting pin means on shoe section 10. This socket means, in the embodiment of FIGURES 1 through 3, is formed by members 40 and 41 secured to cylindrical segment 14 and web element 15 of shoe section 11 as by welding 42 and 43. The members 40 and 41 are secured respectively on opposite sides of web element 15.

Each member has a recess 45 which faces generally radially outwardly and in which one of the lugs 30 on shoe section 10 is received. Recess 45 has an inclined portion 46 terminating in an abutment portion 47. The functioning and cooperation of the pin means with the socket means as the friction unit assembly is applied in use will be described in more detail hereinafter.

Members 40 and 41 additionally are provided with an arm 50 which extends outwardly toward shoe section 10 to overly the radially inner edge 32 of the adjacent guide element. As shown in FIGURE 1, the arm 50 of member 40 overlies the end of shoe section 10 and, in the position illustrated, engages the inner edge 32 of guide element 22.

In order that shoe sections 10 and 11 will be biased to a retracted position, with the interconnecting means in the relation shown in FIGURE 1, compression springs 55 are provided engaged with projections 37 and compressed between legs 35 on guide elements 22 and 23 and arms 50 on members 40 and 41. It will thus be seen that springs 55 serve to urge lugs 30 into the socket means formed by recesses 45 while arms 50 engage the stop means formed by the edges 32 of the guide elements to limit the retracted or contracted relationship between shoe sections 10 and 11.

It may be pointed out that a guide pocket, such as provided between elements 22 and 23 for the end of web element 15, may alternatively be provided between members 40 and 41, with web element 15 terminating short of the end of segment 14 and web element 13 extending beyond the end of segment 12 and slidably engaging between members 40 and 41. In such an alternative arrangement, members 40 and 41 become guide elements.

Reference will now be had to the structural embodiment illustrated in FIGURES 4 through 7. This embodiment includes the essential operating features characteristic of the heretofore described structure and accordingly, a single description of the operation of the friction unit assembly will be given for both embodiments after the description of this second embodiment. The structural embodiment of FIGURES 1 through 3 may be considered the preferred embodiment in that it provides a double bearing surface between the socket means and connecting pin means. It is not only well suited for manufacture of new brake shoes but also ideal for the modification and adaptation of existing automotive brake shoes to incorporate the features of the instant invention. FIGURES 4 through 7 show a possible alternative structure having particular utility for use in manufacture of new brake shoes as substitutes for presently used and available brake shoes.

FIGURES 4 through 7 illustrate details of an interconnecting means made in accordance with the instant invention whereby arcuate shoe sections 60 and 61 are connected in longitudinally aligned end to end relation. Shoe section 60 includes a cylindrical segment 62 and a web element 63 with the outer surface of the cylindrical segment having friction lining material L secured thereto. Similarly shoe section 61 includes a cylindrical segment 64 having a radially inwardly extending web element 65 with friction lining material L secured to the outer surface of the cylindrical segment 64.

A pair of guide elements 70 and 71 are positioned on opposite sides of web element 65 of shoe section 61. These elements may be suitably attached to shoe section 61 as by means of welding 72 and 73. The guide elements 70 and 71 extend outwardly to slidingly engage opposite sides of a portion of web element 63 on shoe section 60. Thus, the shoe sections 60 and 61 are accurately retained in longitudinally aligned end to end relation. It will be readily recognized that the guide elements 70 and 71 may be attached to shoe section 60 instead of shoe section 61. In either case, they provide a pocket in which a portion of the web element on the other shoe section is slidably and guidably received.

Shoe section 60 is provided with connecting pin means in the form of a lug 75 connected to the end of web element 63 by a neck portion 76. Lug 75 is provided with an arcuately curved end portion which pivotally and slidably engages in socket means formed on the end of shoe section 61. Inwardly of the end of shoe section 60, stop means is provided by the radially inner edge 77 of web element 63.

Web element 63 is further provided with a spring supporting leg 78 which extends outwardly to overlie lug 75, neck portion 76 and edge 77. A spring retainer 79 engages leg 78 and provides spring retaining projections in a manner described in more detail hereinafter.

The socket means on shoe section 61 is provided by a recess 80 facing generally radially outwardly. This recess if formed on the end of web element 65. Recess 80 has an inclined portion 81 terminating in an abutment portion 82. An arm 85 extends outwardly from web element 65 to overlie the radially inner edge 77 of the adjacent portion of web element 63 on shoe section 60.

A pair of compression springs 90 are disposed between spring supporting leg 78 and arm 85 to urge lug 75 into firm cooperative engagement with recess 80 and retain the shoe sections 60 and 61 in their fully retracted or contracted position. This position is shown in FIGURE 4 wherein arm 85 is in engagement with stop means formed by the radially inner edge 77 of the adjacent portion of web element 63.

Referring in more detail to spring retainer 79, reference may be had to FIGURE 7 on the drawings. This retainer may be suitably formed from sheet metal having an initial configuration as shown in FIGURE 7. Such retainer has spring locating projections 95. As shown more clearly in FIGURES 4 and 5, the sheet metal retainer 79 is bent around leg 78 with projections 95 cooperating and entering the center of one of springs 90. Preferably the projections 95 are bent to provide a generally cylindrical locating projection to hold the springs 90 properly spaced between leg 78 and arm 85.

In both of the hereinabove described embodiments of the instant invention, a pair of springs have been provided. Utilizing a pair of springs has certain advantages in operation of the friction unit assembly. With the springs positioned as shown in the illustrated embodiments, one of the springs performs the prime function of urging the connecting pin means into firm cooperative engagement with the socket means. The other spring performs the prime function of urging the arm on one shoe section into engagement with the stop means on the other shoe section to urge the shoe sections toward their fully retracted or contracted relationship. It will be appreciated that in certain applications and where economy of construction is a critical factor, a single spring may be employed instead of the two springs as illustrated in each of the embodiments. Where only a single compression spring is employed, it preferably is to be centered along the length of the spring supporting leg and arm.

Having described the structure of the two specificallly illustrated embodiments, reference may now be had to the functioning of the friction unit assemblies. The mode of actuation and operation of the two assemblies is essentially the same. Accordingly, a single description of the operation will be given, it being understood that such description is applicable to the embodiment of FIGURES 1 through 3 as well as the embodiment of FIGURES 4 through 7.

In FIGURES 1 and 4 the shoe sections are shown disposed in their normally fully retracted, contracted or relaxed relationship. In this state, while no actuating or operating force is being applied to effect a braking or clutching operation, the friction unit assembly is withdrawn from engagemnt with the drum surface. In this respect the entire assembly is withdrawn by the conventional shoe retracting springs as are well known in brake mechanisms.

The compression springs of the assembly are effective in drawing the connecting pin means radially inwardly into the bottom of the socket means and also in urging the arm on one shoe section into engagement with the stop means on the other shoe section so that the shoe sections are pivoted to their minimum arc.

As actuating or operating force is applied by a suitable actuating mechanism such as, for example, a hydraulic brake cylinder, the force transmitted from the actuator to the live end of the friction unit assembly causes the shoe sections to pivot outwardly toward an arc conforming to the radius of curvature of the drum surface. This outward pivoting, which occurs between the connecting pin means and the socket means is resisted by the compression springs since this pivoting action tends to move the arm carried by one shoe section away from the stop means on the other shoe section.

As the friction unit assembly expands to an arc corresponding to the radius of curvature of the drum surface, the lining material L engages with the drum surface. The continued application of actuating force from the actuating mechanism causes the connecting pin means to slide within the socket means along the inclined wall portion of such socket means. Therefore, the shoe sections are cammed relative to each other to transmit the force, urging the lining material against the drum surface, from the end of one shoe section to the end of the other shoe section and thereby more uniformly distribute the pressure forcing the lining material L into engagement with the drum surface. As a limit to this camming action, the connecting pin means, after being moved along the entire length of the inclined wall portion of the socket means, finally engages with the abutment portion of the socket means, whereby further camming action is terminated and subsequent brake applying force is thereafter transmitted between the connecting pin means and the abutment portion of the socket means. It will be appreciated that camming action of the pin means along the inclined wall portion of the socket means is resisted by compression of the springs normally biasing the pin means into the bottom of the socket means.

Upon release or cessation of the applying or operating force, the compression springs act to return the shoe sections to their normal relaxed or contracted position and to the relationship shown in FIGURES 1 and 4, such that the lining material L is disengaged from the drum surface. In such relationship the friction unit assembly is conditioned for effecting the next succeeding brake or clutch operation.

In construction of a friction unit assembly in accordance with the instant invention, particular attention is to be directed to the formation of the socket means. From the above description, it will be recognized that the camming action forms an important part, together with the pivoting action, in urging the friction lining material into uniform engagement with the drum surface. The inclined portion of the socket means may be, as shown on the drawings, straight and inclined at a predetermined angle to a radius of the assembly which intersects one end of the socket means. This will give a uniformly controlled transfer of force between the shoe section ends as the brake or clutch applying force is transmitted to the friction unit assembly. Such transfer may be approximately proportional to the magnitude of the brake or clutch applying force.

Alternatively, the inclined portion of the socket means may have what may be termed a variable angle wherein this inclined portion curves outwardly to the point where it meets the abutment portion of the socket means. In the use of this latter type of socket configuration, the camming angle varies as the pin means moves outwardly along the inclined portion of the socket means with the limit of movement being determined by engagement of the pin means with the abutment portion of the socket means.

In utilization of friction unit assemblies made in accordance with the instant invention, it has been found to be important that the shoe section carrying the socket means be disposed toward the dead end or anchor pin of the brake structure, while the shoe section carrying the connecting pin means is disposed toward the live end or point of application of the brake actuating force. In such mode of application, the socket means in effect functions as a secondary anchor in relation to the shoe section carrying the connecting pin means. As brake applying force is exerted against the live end of the friction unit assembly, the connecting pin means is cammed outwardly along the inclined portion of the socket means carried on the other shoe section. This assures firm engagement of the friction lining material on the shoe section which is disposed toward the live end, with the drum surface.

In connecting friction unit assemblies of this invention into a brake or clutch structure, the hereinabove referred to relationship of the shoe sections to the live and dead ends, respectively, achieves the important operation of containing the forces developed in the shoe section toward the live end. Since the shoe section toward the live end of the assembly is more or less freely movable in accordance with operation of the actuating mechanism, the forces developed at this live end must be contained and effectively employed in urging this shoe section into drum engagement. Connection of the assemblies as heretofore referred to achieves this containing of the forces.

By way of specific example, utilization of friction unit assemblies made in accordance with the instant invention in a Bendix type brake structure would call for the assembly forming the primary shoe to have the shoe section carrying the pin means at the toe of such shoe and engaged by the actuating hydraulic cylinder. The shoe section carrying the socket means will be disposed toward the heel of the primary shoe and connected at its end to the conventional star adjustment. The secondary shoe in such a Bendix brake installation will have the shoe section carrying the connecting pin means disposed toward the heel of such secondary shoe and connected to the opposite end of the star adjustment while the other shoe section carrying the socket means will be disposed toward the toe of such secondary shoe.

In the so-called Lockheed type brake, the shoe section carrying the socket means will be disposed toward the fixed anchor pin with which such shoe section cooperates while the shoe section carrying the pin means will be disposed toward the live end and connected to the actuating hydraulic cylinder.

I claim:

1. In a brake or clutch structure, a friction unit assembly adapted to be selectively engaged with a drum comprising first and second arcuate shoe sections, each of said sections having a cylindrical segment for friction lining material and a web element extending radially inwardly from and longitudinally of said cylindrical segment, a pair of guide elements secured respectively on opposite sides of the web element of one of said shoe sections and extending beyond such web element to form a pocket therebetween opening outwardly of the end of said one of said shoe sections and in which the web element on the other of said shoe sections is received, the inner walls of said pocket slidably engaging opposite sides of said received web to prevent movement of said web about its longitudinal axis, socket means at the end of said first shoe section providing a pivot axis disposed transversely of the end of said first shoe section, connecting pins means at the end of said second shoe section with the axis thereof disposed transversely of the end of said second shoe section, said pin means being engaged in said socket means to interconnect said first and second shoe sections in end to end longitudinal alignment, and means biasing said pin means into engagement with said socket means, said first shoe section and said second shoe section being stabilized against relative movement about their aligned longitudinal axis by said slidably engaged, pocket received web.

2. In a brake or clutch structure, a friction unit assembly as recited in claim 1 wherein said connecting pin means comprises a lug on the outer end of each of said guide elements, and said socket means is formed by a pair of members secured respectively on opposite sides of the web element of said first shoe section, each of said members having a recess facing generally radially outwardly with an arm extending outwardly to overlie the radially inner edge of the adjacent guide element.

3. In a brake or clutch structure, a friction unit assembly as recited in claim 1 wherein said connecting pin means comprises a lug on the outer end of the web element of said second shoe section and said socket means is formed on the web element of said first shoe section with an arm extending outwardly to overlie the radially inner edge of the web element of said one shoe section.

4. In a brake or clutch structure, a friction unit assembly adapted to be selectively engaged with a drum comprising first and second arcuate shoe sections, each of said sections having a cylindical segment for friction lining material and a web element extending radially inwardly from and longitudinally of said cylindrical segment, guide elements on opposite sides of the web element of one of said shoe sections and extending beyond such web element to form a pocket therebetween opening outwardly of the end of said one of said shoe sections and in which the web element on the other of said shoe sections is received, the inner walls of said pocket slidably engaging opposite sides of said received web to prevent movement of said web about its longitudinal axis, socket means at the end of said first shoe section providing a pivot axis disposed transversely of the end of said first shoe section, connecting pin means at the end of said second shoe section with the axis thereof disposed transversely of the end of said second shoe section, said pin means being engaged in said socket means to interconnect said first and second shoe sections in end to end longitudinal alignment, said socket means having an inclined portion extending outwardly at a predetermined angle relative to a radius of the arcuate shoe sections which intersects one end of said inclined portion, said inclined portion terminating in an abutment portion whereby in use of said assembly camming movement of said pin means within said socket means is terminated, and means biasing said pin means into engagement with said socket means, said first shoe section and said second shoe section being stabilized against relative movement about their aligned longitudinal axis by said slidably engaged pocket received web.

5. In a brake or clutch structure, a friction unit assembly adapted to be selectively engaged with a drum comprising first and second arcuate shoe sections, each of said sections having a cylindrical segment for friction lining material and a web element extending radially inwardly from and longitudinally of said cylindrical segment, guide elements on opposite sides of the web element of one of said shoe sections and extending beyond such web element to form a pocket therebetween opening outwardly of the end of said one of said shoe sections, the web element on the other of said shoe sections extending into said pocket to slidably engage opposite walls thereof and retain said shoe sections in longitudinally aligned end to end relation, said first shoe section and said second shoe section being stabilized against relative movement about their aligned longitudinal axis by said slidably engaged, pocket received web, socket means at the end of said first shoe section providing a pivot axis disposed transversely of the end of said first shoe section, connecting pin means at the end of said second shoe section with the axis thereof disposed transversely of the end of said second shoe section, said pin means being engaged in said socket means to interconnect said first and second shoe sections in end to end longitudinal alignment, and means biasing said pin means into engagement with said socket means.

6. In a brake or clutch structure, a friction unit assembly as recited in claim 5 wherein said socket means includes a recess opening generally radially outwardly and said pin means includes a lug provided with a generally radially inwardly facing surface in cooperative engagement with said recess.

7. In a brake or clutch structure, a friction unit assembly as recited in claim 5 wherein said socket means includes recesses disposed on opposite sides of the web element of said first shoe section and said pin means includes lugs on said second shoe section engaged with said recesses.

8. In a brake or clutch structure a friction unit assembly as recited in claim 5 wherein said socket means includes a recess formed on the end of the web element of said first shoe section and said pin means includes a lug connected by a neck portion to the web portion of said second shoe section.

9. In a brake or clutch structure, a friction unit assembly adapted to be selectively engaged with a drum comprising first and second arcuate shoe sections, each of said sections having a cylindrical segment for friction lining material and a web element extending radially inwardly from and longitudinally of said cylindrical segment, guide elements on oposite sides of the web element of one of said shoe sections and extending beyond such web element to form a pocket therebetween opening outwardly of the end of said one of said shoe sections, the web element on the other of said shoe sections extending into said pocket to slidably engage opposite walls thereof and retain said shoe sections in longitudinally aligned end to end relation, said first shoe section and said second shoe section being stabilized against relative movement about their aligned longitudinal axis by said slidably engaged, pocket received web, socket means at the end of said first shoe section providing a pivot axis disposed transversely on the end of said first shoe section, connecting pin means at the end of said second shoe section with the axis thereof disposed transversely of the end of said second shoe section, said pin means being engaged in said socket means to interconnect said first and second shoe sections in end to end longitudinal alignment, an arm extending outwardly from the end of said first shoe section to overlie the end of said second shoe section inwardly of said pin means, a spring supporting leg extending from said second shoe section generally parallel to said arm, and compression spring means disposed between said arm and leg to urge said pin means into engagement with said socket means.

10. In a brake or clutch structure, a friction unit assembly as recited in claim 9 wherein said spring supporting leg is provided with spring locating projection means and said compression spring means includes a helical spring engaged by said projection means.

11. In a brake or clutch structure, a friction unit assembly as recited in claim 10 wherein said spring locating projection means includes a spring retainer formed of sheet metal encasing said leg and having a projection engaging said helical spring.

References Cited in the file of this patent

UNITED STATES PATENTS

| | | |
|---|---|---|
| 882,299 | Dexter | Mar. 17, 1908 |
| 2,616,528 | Swanson | Nov. 4, 1952 |
| 2,723,016 | Goldberg | Nov. 8, 1955 |
| 2,778,470 | Goldberg | Jan. 22, 1957 |